June 16, 1953     G. B. PARSONS ET AL     2,642,370
METHOD OF LAMINATING MATERIAL AND RESULTING PRODUCT
Filed Oct. 18, 1949
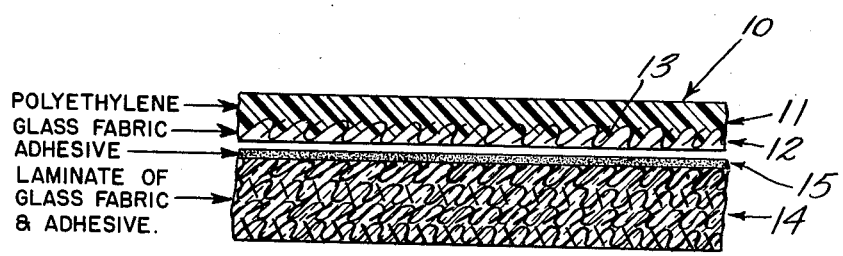
INVENTORS.
GEORGE B. PARSONS &
DANIEL DEPEW
BY
*Their* ATTORNEYS.

Patented June 16, 1953

2,642,370

UNITED STATES PATENT OFFICE 2,642,370

METHOD OF LAMINATING MATERIAL AND RESULTING PRODUCT

George B. Parsons, Baldwin, and Daniel Depew, Wyandanch, N. Y., assignors to Fairchild Engine and Airplane Corporation, New York, N. Y., a corporation of Maryland Application October 18, 1949, Serial No. 122,146

8 Claims. (Cl. 154—128)

This invention relates to methods of laminating sheet material and the resulting product, and has particular reference to the manufacture of laminates of glass fabric and polyethylene, or their equivalents.

The use of glass fabric laminates in radomes, fairings and other exposed parts of high speed aircraft has created a serious erosion problem, principally by impinging rain drops and, at supersonic speeds, dust particles also cause damage. Glass fabric laminates, which are highly desirable because of strength, high frequency radiation "transparency," moldability and non-strategic availability, show a marked susceptibility to erosion under the circumstances mentioned because of the practical impossibility of producing void-free laminates by current molding techniques and the unerring capacity of the eroding particles to seek out and enlarge to the point of damage those otherwise undiscernible voids in the laminate.

It has been demonstrated by the applicants that polyethylene develops excellent adhesion to dry, uncoated glass fabric when fused to it under suitable temperature and pressure conditions. A superficial adhesion to certain other materials may be developed by fusing the polyethylene to the surfaces of the latter at 225° F. or higher temperature. Upon cooling, however, the high shrinkage, as much as 20% volumetrically, of the polyethylene in passing through the fluid-solid transition phase, normally imparts internal stresses in the polyethylene itself, which are great enough to impair or destroy effective adhesion. Accordingly, when the usual thermo-pressure molding technique is employed to simultaneously bond multiple resin-impregnated glass cloth layers and sheet polyethylene in one operation, poor adhesion normally results due to the weak union between laminating resin and polyethylene. The micro-thin region between polyethylene and glass filler will invariably be occupied by laminating resin, whether cured or uncured, depending upon the heating cycle employed, thus precluding the existence of an effective glass-polyethylene bond at the interface. Fusion of polyethylene onto a cured glass fabric laminate surface similarly is unsatisfactory because of the weakness of the attempted bond between cured resin and polyethylene. Sanding of the laminate surface to remove resin glaze and expose glass fibers affords little improvement, as apparently too little "active" glass surface is available to provide adequate adhesion. Spraying molten polyethylene onto a cured glass fabric laminate gives similarly poor adhesion, whereas spraying onto a dry fabric gives a permeable film.

In accordance with the present invention, a method of uniting polyethylene and equivalent elastomers to glass fabric is provided, whereby a coextensive bond of uniform unit strength between the two is obtained without impairing the inherent physical properties of the polyethylene and without resorting to disproportionately costly and time-consuming measures, thus enabling the production of laminated structures such as radomes, fairings and the like which accordingly partake of the property of polyethylene of immunity to erosion and retain the desirable mechanical properties of the glass fabric for the intended purpose.

The invention essentially comprises fusing a homogeneous sheet of polyethylene, or polyethylene modified with polyisobutylene, or their equivalents, to the surface of a sheet of woven glass fabric under pressure, then bonding the glass fabric surface of this two-ply laminous unit by usual bonding methods to the surface of the panel or other article on which it is to be mounted. In this way, the protective polyethylene layer is adhered uniformly to the supporting panel surface without blistering or otherwise impairing the desirable physical and chemical properties that induced its use in the first instance. The product produced according to this method accordingly is substantially immune to erosion and serves admirably as a protective surface covering for high-speed aircraft and airborne missiles and also is useful as a liner for containers of corrosive liquids such as nitric, sulfuric, fluoric and other corrosive acids and chemical compounds.

More particularly, the method of this invention comprises bonding a homogeneous sheet of about .010 inch to about .060 inch thickness of polyethylene of relatively high molecular weight of between about 5,000 and about 100,000 by fusing the same at temperatures of between about 260° and about 290° F. and under pressures of between about 10 and about 30 pounds per square inch for about 20 minutes to one side of a single unimpregnated or uncoated layer of glass fabric. Pressures as high as 150 pounds per square inch may be employed, depending upon requirements. The resulting two-ply laminous unit is very flexible and homogeneous, the heat-softened polyethylene sheet having retained its original physical characteristics and having been merely pressed into the interstices between the fibers and threads constituting the glass fabric, without bleeding through the fabric, but nevertheless adhering securely and coextensively thereto with a uniform unitary adhesion resisting a cleavage force in excess of 12 pounds per linear inch.

In one method of utilizing this two-ply laminous unit, the exposed glass fabric surface, i. e., the back of the two-ply polyethylene-glass fabric laminous unit is then coated with a suitable adhesive, such as a thermo-responsive laminating material like styrene-polyester, polyester, acrylic, vinyl and similar polymerizable synthetic resin, and the remainder of the adhesive-coated or impregnated glass fabric laminates are assembled in contact with the said back surface of the two-ply laminous unit and the resulting lay-up polymerized under heat and pressure into a hard panel of the desired contour, one surface of which is covered with the polyethylene, having the characteristic waxy, semi-hard, translucent surface.

Alternatively, the panel to which the polyethylene-glass fabric, two-ply fused laminous unit is to be applied may be formed to the desired shape and thickness and the glass fabric side of the polyethylene-glass laminous unit bonded to its surface. In the latter case, the assembly of the polyethylene-glass fabric laminous unit to the preformed panel is conducted at temperatures not materially exceeding 210° F. in order to preclude impairment of the initial bond between the polyethylene and the single glass fabric sheet.

In the first alternative of the new method, the polyethylene sheet is adhered to the clean, unimpregnated, uncoated and dry glass fabric and, because the intervening glass fabric sheet appears to protect its bond with the plastic protecting layer, the contact or addition polymer resins commonly and otherwise desirably employed to bond glass fabric laminates, such as styrene-polyester, polyester, acrylic, vinyl and like resins may be used as the polymerizable bonding material between the back of the coated glass fabric and between the other glass fabric laminates constituting the finished panel, notwithstanding that these bonding resins are incompatible with polyethylene. The entire assembly may then be cured under heat and pressure in an autoclave in or over a die shaped to the desired contour for the finished panel, of which the polyethylene protective layer may be on a concave or convex side, depending upon the surface of contact with the erosive or corrosive medium.

In the second alternative of the new method, the laminated panel is first formed to the desired contour and then overlaid with the two-ply polyethylene-glass fabric laminous unit, with the exposed surface of the glass fabric or of the panel coated with bonding adhesive, like a styrene-polyester resin, and then cured in a rubber bag in an autoclave, in which case the cured panel acts as the die, to the surface of which the polyethylene-fabric laminous unit is bonded at about 210° F.

A more complete understanding of the invention may be had upon reference to the accompanying drawing showing the panel of this invention made according to the method of this invention. In the drawing, numeral 10 designates the two-ply laminous unit consisting of a polyethylene sheet 11 fused and applied under pressure to the single sheet 12 of dry unimpregnated or uncoated glass fabric so that the heat-softened polyethylene intrudes into the meshes of the glass fabric sheet 12 in the manner indicated at 13, so that the exposed opposite surface of the glass fabric sheet 12 remains uncoated and free of polyethylene.

The two-ply laminous unit 10 thus formed is adhered by its exposed glass fabric surface to a single sheet of fabric or, as shown in the drawing, to a preformed panel 14, by adhesive 15. For reasons of emphasizing the integral nature of the two-ply laminous unit 10, it is shown slightly spaced from the adhesive layer 15 joining it to the panel 14.

Although polyethylene is desired where the dual purpose of erosion- and corrosion-proofness are desired, only one of these properties may be required at a time, so that an elastomer having abrasion-resistant properties approaching those of polyethylene may be utilized where ultra-high speed aircraft use is not required, but where the pecularities of glass fabric are desirable. Thus, the addition of up to 50% by weight of polyisobutylene enhances the thermal flowability of the polyethylene without materially modifying its properties. Also, certain equivalent abrasion-resistant elastomers and elastomer-like materials having semi-hard surfaces when provided in homogeneous sheet form, such as fluorine and chlorine substituted polyethylenes, and the like, may be utilized and adhered to glass fabric according to the method of this invention to form the two-ply flexible laminous unit for subsequent adhesion to the basic panel materials.

Also, where the glass-fabric properties are not required, but the erosion- or corrosion-proofness of polyethylene are desired, the latter may be adhered in the manner described to other fabrics such as asbestos, rayon, and other natural and synthetic fiber fabrics.

Although a preferred embodiment of the invention has been described herein, it is to be understood that the invention is not limited thereto, but is susceptible of changes in form and detail within the scope of the appended claims.

We claim:

1. The method of forming a multiple-ply article, which comprises fusing a flexible sheet of polyethylene to one surface of a flexible sheet of relatively closely woven fabric of dissimilar material under heat and pressure to soften the polyethylene and cause it to penetrate into the meshes of the fabric and thus unite said sheets, said polyethylene penetrating only partially through said fabric to leave the opposite surface thereof exposed, and then adhering the said exposed fabric surface of the resulting two-ply fabric-polyethylene unit to the surface of another ply of fabric with an interposed adhesive.

2. The method of forming a multiple-ply article, which comprises fusing a flexible sheet of polyethylene of molecular weight between about 5,000 and about 100,000 to one surface of a flexible sheet of glass fabric under heat and pressure to intrude the softened polyethylene into the meshes of the fabric and thus unite said sheets, said polyethylene penetrating only partially through said fabric to leave the opposite side exposed, and then adhering the exposed fabric surface of the resulting two-ply fabric-polyethylene unit as one component of the article to the surface of another ply of fabric with an interposed adhesive.

3. The method of forming a multiple-ply article, which comprises fusing a flexible sheet of polyethylene under pressure to one surface of a flexible sheet of glass fabric at temperatures between about 260° F. and about 290° F., to intrude said polyethylene into the meshes of said fabric to an extent sufficient to bond the polyethylene to the fabric and insufficient to cover the fibers at the opposite surface of the fabric, and then adhering said opposite fabric surface of the resulting two-ply fabric-polyethylene unit as one component of the article to the surface of another component of the article by an interposed thermo-plastic adhesive.

4. The method of forming a multiple-ply article, which comprises fusing a flexible sheet of heat-softened polyethylene to one surface of a flexible sheet of glass fabric under pressure of between about 10 and about 150 pounds per square inch to intrude the softened polyethylene into the pores of the fabric and thus mechanically unite said sheets, said polyethylene penetrating only partially through said fabric to leave the fibers at the opposite surface exposed, and then adhering the exposed fabric surface of the resulting two-ply fabric-polyethylene unit as one component of the article to the surface of another ply of fabric with an interposed adhesive.

5. The method of forming a multiple-ply article, which comprises fusing a flexible sheet of polyethylene to one surface of a flexible sheet of glass fabric at temperatures between about 260° F. and about 290° F. and under pressure of between about 10 and about 150 pounds per square inch to intrude the softened polyethylene into the pores of the fabric and thus mechanically unite said sheets, said polyethylene penetrating only partially through said fabric to leave the fibers at the opposite surface exposed, and then adhering the exposed fabric surface of the resulting two-ply fabric-polyethylene unit as one component of the article to the surface of another ply of fabric with an interposed adhesive.

6. The method of forming a multiple-ply article, which comprises fusing a flexible sheet of a resin having the properties of a homogeneous sheet of polyethylene of molecular weight between about 5,000 and about 100,000 to one surface of a glass fabric sheet under heat and pressure to intrude the softened polyethylene into the pores of the fabric and thus mechanically unite said sheets, said polyethylene penetrating only partially through said fabric to leave the fibers at the opposite surface exposed, and then adhering the exposed fabric surface of the resulting two-ply fabric-resin unit as one component of the article to the surface of another component of the article with an interposed adhesive.

7. The method of forming a flexible two-ply laminous unit which comprises heat-softening one surface of a flexible sheet of polyethylene of molecular weight between about 5,000 and about 100,000 and thickness of between about .010 and about .060 inch, applying the said heat-softened surface to one surface of a single flexible sheet of woven glass fabric under pressure of between about 10 and about 30 pounds per square inch to cause the heat-softened polyethylene to intrude into the meshes of and only partially through the fabric to leave the glass fibers exposed at the opposite surface of said fabric and thus mechanically unite said sheets, and then bonding the exposed fibers of said fabric to another sheet of woven fabric by pressing them together with a layer of adhesive interposed between said opposite surface and said other sheet.

8. As a new article of manufacture, a multiple-ply article comprising a substantially rigid panel formed of a plurality of layers of glass fabric adhesively bonded together in superimposed relation, and a flexible two-ply laminous unit comprising a layer of polyethylene of molecular weight between about 5,000 and about 100,000 mechanically secured coextensively to only one surface of a single sheet of glass fabric by intrusions of said polyethylene extending into and only partially through the meshes of said single glass fabric sheet, whereby the opposite surface of said sheet is free of said polyethylene, said polyethylene-free opposite glass fabric surface of said two-ply laminous unit being adhesively bonded to one glass fabric surface of said panel with the polyethylene layer of said two-ply laminous unit affording an outer surface of the complete multiple-ply article.

GEORGE B. PARSONS.
DANIEL DEPEW.

References Cited in the file of this patent

UNITED STATES PATENTS

| Number | Name | Date |
|---|---|---|
| 1,352,739 | Egerton | Sept. 14, 1920 |
| 2,184,326 | Thomas | Dec. 26, 1939 |
| 2,332,373 | Dorough | Oct. 19, 1943 |
| 2,340,452 | Child et al. | Feb. 1, 1944 |
| 2,366,514 | Gaylor | Jan. 2, 1945 |
| 2,429,688 | Hoover | Oct. 28, 1947 |
| 2,491,761 | Parker et al. | Dec. 20, 1949 |

OTHER REFERENCES

Honish: "Techniques of Handling Polyethyline," Plastics Industry, May 1949, pages 25–28.